United States Patent Office 3,476,187
Patented Nov. 4, 1969

3,476,187
OIL RECOVERY WITH A DRIVE COMPRISING SURFACTANTS AND MINUTE SOLIDS
Robert R. Harvey, Bartlesville, Okla., assignor to Phillips Petroleum Company, a corporation of Delaware
No Drawing. Continuation-in-part of application Ser. No. 483,845, Aug. 30, 1965. This application Mar. 25, 1968, Ser. No. 715,502
Int. Cl. E21b 43/20
U.S. Cl. 166—274    10 Claims

ABSTRACT OF THE DISCLOSURE

Oil is produced by fluid drive using a slug in advance of the drive which contains a suspension of minute solids such as carbon black and two polyethylene oxide-type surfactants.

---

This is a continuation-in-part of U.S. application, Ser. No. 483,845, filed August 30, 1965, and now abandoned.

This invention relates to an improved process for producing oil from an oil stratum by aqueous fluid drive utilizing oil-displacing agents including surfactants and minute solids.

It has been found that certain minute solids such as carbon black, kaolin, and talc, as disclosed in the application of Myron L. Corrin, Ser. No. 451,026, filed Apr. 26, 1965, now U.S. Patent No. 3,326,287, when added to an aqueous driving fluid containing dissolved surfactants having oil-displacing properties, function as carriers for the displacing surfactants and more effectively transport the surfactants deeper into the stratum to more effectively displace oil. Other solids which have been found to function similarly are dead microorganisms including bacteria and yeast cells as disclosed in the application of R. R. Harvey, Ser. No. 449,307, filed Apr. 19, 1965, now U.S. Patent No. 3,326,286. While the processes of these applications provide a greater penetration and dispersion of the surfactant than in processes utilizing the surfactant alone, it has been found that such suspensions, and particularly those made with carbon black, tend to settle out quickly or the particles tend to agglomerate if the suspensions are allowed to stand for any length of time. There is a tendency to plug, especially in even slightly brackish water.

This invention is concerned with an improved process for displacing oil from an oil stratum utilizing aqueous fluid drive in which a slug or surfactant containing suspended solids is utilized in advance of the flooding or driving agent.

Accordingly, it is an object of the invention to provide an improved process for recovering oil from an oil stratum by aqueous fluid drive. Another object is to provide a better suspension of minute solid carriers for injection in an aqueous fluid drive process. A further object is to provide an improved process for utilizing surfactants and solid surfactant carriers for injection into an oil stratum in advance of an aqueous driving medium. Other objects of the invention will become apparent to one skilled in the art upon consideration of the accompanying disclosure.

The invention comprises injecting into a well in an oil stratum from 0.05 to 1 pore volume of an aqueous slug comprising (a) a suspension of minute solids of a size in the range of 0.001 to 1 micron capable of being driven through said stratum by aqueous fluid drive to assist in displacing oil therefrom; (b) a surfactant having the formula R—R'—R"—H wherein R is an aliphatic alkyl of 9 to 20 carbon atoms or an alkylaryl of which the alkyl has 8 to 20 carbon atoms and the aryl is attached to R', R' is O (oxygen) or S (sulphur), and R" is polyethylene oxide of an average of 4 to 11 units, in solution in a concentration in the range of 0.01 to 1 weight percent; and (c) a surfactant having the formula R—O—R'—H wherein R is an aliphatic alkyl of 5 to 20 carbon atoms or an alkylaryl, the alkyl having 8 to 20 carbon atoms and the aryl is attached to the O, and R' is polyethylene oxide of an average of 30 to 100 units, in solution in a concentration in the range of 0.01 to 1 weight percent; thereafter injecting aqueous driving medium through said well into said stratum so as to drive said suspension in surfactant solution through said stratum toward at least one offset well therein and displace oil into said offset well and recovering the displaced oil from said offset well.

The invention is based upon the discovery that the addition of certain surfactants to an aqueous suspension of solid surfactant-carrier material in minute form containing an oil-displacing surfactant greatly improves the suspension and provides a synergistic effect in displacing oil even though said certain surfactants have little or no oil-displacing capacity per se. Of the many surfactants commercially available, only a relative few have been found to be effective in displacing oil from an oil stratum. The application of Heino Purre entitled "Oil Production by Aqueous Fluid Drive," Serial No. 481,512, filed August 23, 1065, and now U.S. Patent No. 3,362,474, discloses the relatively few surfactants found to be effective oil displacers. These surfactants are non-ionic surfactants having the formula R—R'—R"—H wherein R is an aliphatic alkyl of 9–20 carbon atoms having 0 to 4 methyl branches or an alkylaryl in which the alkyl has from 8 to 20, preferably 8 to 12, carbon atoms and the aryl is attached to the R', R' is O (oxygen) or S (sulphur), and R" is a polyethylene oxide of an average of 4 to 11, preferably 4.5 to 6.5 units. They belong to the families of polyoxyethylene or polyphenoxyethylene ethers and thioethers. The polyoxyethylene species are exemplified by tall oil ethylene oxide, lauryl alcohol ethylene oxide, polyoxyethylene thioether, and polyoxyethylene lauryl ether, having an average chain length on the hydrophilic end in the required range of 4 to 11, preferably 4.5 to 6.5. Typical of the polyphenoxyethylene species is Igepal CO–530 supplied by Antara Chemical Company and further identified as nonylphenoxy polyethanol having an average chain length on the hydrophilic end of about 6 to 6.5 mols or units of ethylene oxide. The oil-displacing surfactants have the capacity to change the condition of the oil sand from oil-wet to water-wet.

Certain surfactants have been found which do not in themselves have any oil-displacing capacity when utilized in an aqueous fluid drive but have a synergistic effect in combination with the oil-displacing surfactants in an aqueous solution containing a suspension of the carrier solids. These surfactants have greater dispersing capacity than the oil-dispacing surfactants and are nonionic surfactants having the formula R—O—R'—H wherein R is an aliphatic alkyl of 5 to 20 carbon atoms or an alkylaryl, the alkyl having 8 to 20 carbon atoms and the aryl is attached to the O, and R' is polyethyleneoxide of an average of 30 to 100 units or mols. Typical of this class of surfactants is Igepal CO–990, and Igepal DM–970, trade names of Antara. Igepal CO–990 is nonylphenoxy polyethanol having an average chain length on the hydrophilic end in the range of 95–100 mols of units of ethyleneoxide. The minimum number units of ethyleneoxide in the hydrophilic chain is 30, surfactants with a lesser chain having little or no effect when incorporated in the suspension of solids in the oil-displacing surfactant solution.

A broad aspect of the invention comprises incorporating one of the long chain dispersing type surfactants in an aqueous solution of oil-displacing surfactant containing a suspension of minute solid carriers for the surfactant and injecting a slug of the resulting aqueous suspension into an oil stratum in advance of an aqueous driving fluid such as steam and/or water. The solids are of a size in the range of 0.001 to 1 micron and the quantity is in the range of 0.05 to 2 weight percent of the solution. When utilizing dead cells, the concentration thereof is in the range of 0.01 to 0.5 weight percent and preferably 0.08 to 0.15 weight percent. The concentration of oil-displacing surfactant is in the range of 0.001 to 2 weight percent and preferably 0.01 to 1 weight percent and a similar concentration of the dispersing surfactant is used. The size of the slug to be injected is in the range of 0.05 to 1 pore volume of the stratum area to be swept by the drive.

Another embodiment of the invention relates to the manner of forming the suspension of the carrier solids in the surfactant solution and comprises forming a suspension of the solids in the selected concentration in water containing the dispersing surfactant in the selected concentration within the ranges set forth above and centrifuging the suspension to cause any oversized particles in the suspension to drop out or settle to the bottom of the solution so that separation can readily be effected. It is also feasible to add the two types of surfactants simultaneously or successively and then centrifuge the solution containing the suspended solids, although the former method is preferred. While the effective concentration of the solids and surfactant in the slug are slightly less than the initial amounts, the slug is considerably more effective than it would be without the centrifuging treatment.

In the following tests, Igepal CO-990 was used as the dispersing, nonoil displacing surfactant and Philblack I (trademark of Phillips Petroleum Company), a furnace black, was used as the particulate solid surfactant carrier as illustrative of the other solid carrier materials. The discs utilized in the tests were formed by casting a section of core of Burbank sand 1¼ inch in diameter in epoxy resin and the casting was sawed with a diamond saw into ⅛ inch discs having a 1¼ inch core section surrounded by an annular section of epoxy resin. The disc was positioned in a standard millipore filter apparatus attached to a vacuum funnel and the disc was sealed between the filter and a graduated cylinder open to the sand core of the disc so that liquid introduced to the graduated cylinder could be passed through the sand core and filter into the vacuum flask. The selected slug to be tested was introduced to the cylinder and the vacuum was applied.

In the disc tests, clear water was passed through the disc and a suspension of the carbon black was then passed through the disc. The time required for passing a given volume of liquid in each instance was compared.

The microcells utilized in the tests were made from two 3″ x 1″ standard slides with a space of 15 mils between them. The spacing was established by a flat polyethylene bar 15 mils thick and 1/16″ wide. The slides were glued together at the edges with epoxy resin. The 15 mil space was filled with Burbank oil-wet sand and the fluids were injected at one end through a hypodermic needle and were produced through the other end through a hypodermic needle. In order to provide uniform flow over the cross section of the microcells, distribution bars 10 mils thick were positioned at both ends of the sand. The pore volume of the cells was approximately 0.5 cc.

EXAMPLE I

A suspension was made containing water, Igepal CO-990 in a concentration of 0.06 weight percent, and carbon black in a concentration of 0.1 weight percent which were mixed at high speed in a blender for 15 minutes. The resulting mixture was then centrifuged for 1 hour at 500 r.p.m. (relative "g" force approximately 42). The mixture or suspension was then tested by disc filtration with the results set forth in Table I.

TABLE I

| Disc #: | Time (sec.) for water | Time (sec.) for suspension |
| --- | --- | --- |
| 166 | 53 | 59.7 |
| 173 | 30 | 35.5 |
| 174 | 26 | 29.0 |

These data demonstrate the filterability of the suspensions prepared with only the dispersing surfactant in the solution. The suspensions were then checked for behavior under displacement conditions in the microcell. In the microcell tests the sand in the slide was saturated with Burbank oil and allowed to stand for at least one hour. Then the microcell was water flooded with 3 cc. (6 pore volumes) of brine representing connate water in the Burbank sand. After the water flooding of the sand in the microcell, 3 cc. of the carbon black suspension was injected. The results are set forth in Table II.

TABLE II

| Microcell #: | Appearance of suspension | Penetration of suspension | Oil displacement |
| --- | --- | --- | --- |
| 274 | Very fine | Excellent | Negligible. |
| 279 | do | do | Do. |
| 287 | do | do | Do. |

The data in the above table demonstrate that the dispersant type surfactant, while providing excellent suspensions, does not by itself displace or release oil appreciably.

EXAMPLE II

Igepal CO-530 (nonylphenoxy polyethanol having an average of 6 to 6.5 units of ethyleneoxide in the hydrophilic chain) was then added to the suspension to give a resulting concentration of this surfactant of 0.06 weight percent. The mixture was treated in a high speed blender for 15 minutes. The filterability of the resulting mixture was checked by filtration tests in filtration discs. The results are set forth in Table III.

TABLE III

| Disc #: | Time (sec.) for water | Time (sec.) for suspension |
| --- | --- | --- |
| 168R | 51 | 63 |
| 164 | 41 | 30 |
| 175 | 26 | 20 |

These data show that the suspension of carbon black in the mixed solution of surfactants still retains the filterability desired. In fact, the filtering time of the suspension in two of the disc tests was lower than the filtering time of clear water.

The suspension containing both surfactants was then tested for oil displacement by microcell tests as described above and the results are set forth below:

TABLE IV

| Microcell #: | Appearance of suspension | Penetration of suspension | Oil displacement |
| --- | --- | --- | --- |
| 275 | Very fine | Excellent | Good. |
| 280 | do | do | Do. |
| 288 | do | do | Do. |

The term "good" is based upon the observation that at least 50 percent of the residual oil in the microcell after water flooding was displaced. This is good displacement in view of the fact that the use of Igepal CO-530 alone with a suspension of carbon black as set forth in the Corrin Patent No. 3,326,287, referred to above, displaces from 20 to 30 weight percent of the residual oil in the sand in the microcell.

The suspension containing both surfactants was then centrifuged and the filterability measured. The results are presented in Table V.

TABLE V

| Disc #: | Time (sec.) for water | Time (sec.) for suspension |
|---|---|---|
| 163 | 47 | 45 |
| 172 | 30 | 24 |
| 178 | 41 | 27 |

A second centrifuging further improves the filterability.

The oil displacement properties of the twice-centrifuged suspension were again tested in microcells and the results are presented in Table VI.

TABLE VI

| Microcell #: | Appearance of suspension | Penetration of suspension | Oil displacement |
|---|---|---|---|
| 276 | Very fine | Excellent | Good. |
| 281 | do | do | Do. |
| 289 | do | do | Do. |

The oil displacement compared favorably in every way with the results obtained with the suspension before the second centrifuging.

EXAMPLE III

Igepal CO-530 and Igepal CO-990, each in a concentration of 0.06 weight percent, were added to a mixture of carbon black in simulated Burbank produced water in a concentration of 0.1 weight percent. The Burbank produced water contained 40 grams of NaCl, 10.5 grams of $CaCl_2$, and 4.8 grams of $MgCl_2 \cdot 6H_2O$, each per liter of water. The suspension was first tested for filtration in filtration discs. The results are set forth in Table VII.

TABLE VII

| Disc #: | Time (sec.) for water | Time (sec.) for suspension |
|---|---|---|
| 171 | 44 | Plugged after passing 25 ml. |
| 169 | 25 | Plugged after passing 65 ml. |
| 179 | 93 | Plugged after passing 25 ml. |

Similar tests were conducted using Igepal CO-990 alone with similar plugging. The data demonstrate that centrifuging is necessary where the carbon black is not sufficiently fine. If the carbon black is properly classified so as to include only particles less than 1 micron in size, before forming the suspension, centrifuging would not be necessary. However, with unclassified carbon black, it is best to centrifuge the suspension to knock down the heavier particles before injecting the remaining suspension into an oil stratum.

Microcell tests were then conducted on the suspension prepared without centrifuging and the results are presented in Table VIII.

TABLE VIII

| Microcell #: | Appearance of suspension | Penetration of suspension | Oil displacement |
|---|---|---|---|
| 277 | Very fine | Excellent | Good. |
| 282 | do | do | Do. |
| 190 | do | do | Do. |

Microcell test data alone provide no means of distinguishing between the suspension prepared without centrifuging and those of Tables IV and VI. It can be seen, however, by comparing Tables III, V, and VII that this suspension will plug an oil stratum of low permeability whereas the previously centrifuged samples will not. These data show the importance of filtration tests in checking the suspensions for good penetration.

The suspension prepared without centrifuging was then centrifuged at 500 r.p.m. for 1 hour and the filtration characteristics checked in filtration discs. The data in Table IX represent the results.

TABLE IX

| Disc #: | Time (sec.) for water | Time (sec.) for suspension |
|---|---|---|
| 167 | 64 | 63 |
| 148 | 55 | 177 |
| 142 | 78 | 287 |

From the standpoint of beginning and final states the suspension should now be in the same state or condition as that in Table V. The filtration data demonstrate that, while this is qualitatively true (the suspension does not now plug), the preparation method wherein the suspension containing only the dispersant type surfactant is centrifuged before incorporating the oil-displacing surfactant therein is preferred because it produces a more filterable suspension.

The suspension was then given the microcell test. It should be in qualitative agreement with the suspension of Table VI but quantitatively poorer in performance. The data obtained are set forth in Table X.

TABLE X

| Microcell #: | Appearance of suspension | Penetration of suspension | Oil displacement |
|---|---|---|---|
| 278 | Very fine | Excellent | Fair to good. |
| 238 | do | do | Do. |
| 191 | do | do | Do. |

The data are considered to be substantial verification of the above hypothesis.

EXAMPLE IV

Igepal CO-530 (0.06 percent by weight) was mixed with carbon black in a concentration of 0.1 weight percent in a blender for 15 minutes and disc filtration tests were run, the data being presented in Table XI.

TABLE XI

| Disc #: | Time (sec.) for water | Time (sec.) for Suspension |
|---|---|---|
| 176 | 46 | Plugged after 70 cc. |
| 181 | 24 | Plugged after 29 cc. |
| 183 | 60 | Plugged after 65 cc. |

These suspensions were very poor in appearance and settled rapidly in contrast to the very fine, relatively stable appearance of the suspensions containing Igepal CO-990. The suspension was then given the microcell test and the data obtained are presented in Table XII.

TABLE XII

| Microcell #: | Appearance of suspension | Penetration of suspension | Oil displacement |
|---|---|---|---|
| 285 | Coarse flakes | Poor to fair | Fair. |
| 292 | do | Poor | Do. |
| 294 | do | do | Do. |

The data clearly demonstrate the lack of beneficial results provided by Igepal CO-990. The function of the Igepal CO-530 can be seen in the fair oil displacement obtained even under adverse conditions. The function of the Igepal CO-990 is apparent both from the standpoint of better penetration and also in displacing more oil by virtue of this penetration, even though, by itself, it is incapable of oil production. This clearly demonstrates the truly synergistic effect produced by the incorporation of the Igepal CO-990 in the solution with the oil-producing surfactant.

In a final test, the poor suspension of the carbon black in Igepal CO-530 was centrifuged for 1 hour at 500 r.p.m. Judging from the appearance of the decantate and the amount of carbon thrown down (about 6 times the usual volume) a considerable portion of the suspension was lost. The remaining suspension was tested for filterability in the filtering discs and the results are presented in Table XIII.

TABLE XIII

| Disc #: | Time (sec.) for water | Time (sec.) for suspension |
|---|---|---|
| 165 | 34 | 27.8 |
| 182 | 31 | 28.5 |
| 184 | 40 | 27 |

This very thin suspension was not surprisingly filterable as might be expected, compared to much more concentrated suspensions. Its performance in oil displacement was determined by microcell tests and the data presented in the table below:

TABLE XIV

| | Appearance of suspension | Penetration of suspension | Oil displacement |
|---|---|---|---|
| Microcell #: | | | |
| 286 | Coarse flakes | Poor | Fair to poor. |
| 293 | do | do | Poor. |
| 295 | do | do | Fair to poor. |

It is apparent that even though the filterability is improved by centrifuging, the displacement suffers from the lack of Igepal CO-990, the better dispersant type surfactant.

The preferred method of preparing the suspension to be used as the injected slug in advance of the aqueous fluid drive comprises stirring rapidly (as in a blender), a suspension of the carbon black or other particulate solid while adding the dispersing type surfactant, then centrifuging the resulting suspension to remove settlings, and then returning the suspension (free of settlings) to the blender and adding the oil displacing surfactant thereto.

EXAMPLE V

To show that polyethylene oxide type surfactants which have an average of 6.5 to 11 units are comparable in activity to similar surfactants having 4 to 6.5 units, and that similar surfactants having 15 to 100 units did not have similar activity to those containing 4 to 6.5 units, several runs were carried out using surfactants having units in the range of 6.7 to 100 to determine the amount of adsorption of these surfactants on oil bearing sand.

The greater the weight of the surfactant adsorbed on the sand, the more active that surfactant will be for oil displacement. It was found that the surfactants having 6.7 to 10.5 units exhibited activity similar to the surfactants which have 4 to 11 units while those surfactants having 15 to 100 units were not similar in activity to those surfactants which contained 4 to 6.5 units.

The runs were reservoir and room temperature adsorption tests using Nacatoch outcrop sand. The sand was obtained from one of several outcrop samples, which was picked as being nearly petrographically identical to the oil bearing sand in the Smackover reservoir. The sand was further treated by washing in tap water to remove excess clay and its final identity in surface properties to the reservoir sand was checked by surface area measurement.

The surfactant solution employed in each run was prepared by dissolving the surfactants in simulated Smackover brine and diluting to the concentration indicated in Table XV. Fifty ml. aliquots of each solution was added to 15 grams of dry sand and shaken for 2 hours at the temperature indicated in Table XV. The samples were settled for 1 hour at the test temperature and decanted into smaller bottles and allowed to settle over night. Ten ml. samples were then pipetted from each bottle and analyzed for surfactant concentration by ultra-violet adsorption. The concentration of the surfactant remaining in the solution was used to calculate the adsorption on the sand as given in Table XV.

The results of these runs are set forth in Table XV.

TABLE XV

| Surfactant | $n^1$ | Temperature of Run, 72° F. | | Temperature of Run, 120° F. | |
|---|---|---|---|---|---|
| | | Concentration of surfactant, grams/liter | Weight of surfactant adsorbed, milligrams/gram of sand | Concentration of surfactant, grams/liter | Weight of surfactant adsorbed, milligrams/gram of sand |
| Igepal CO-530 | 6.7 | 1.53 | 1.49 | 0.01 | 0.9 |
| | | 3.33 | 1.33 | 0.02 | 2.7 |
| | | 4.05 | 1.43 | 0.06 | 4.4 |
| | | 4.46 | 1.47 | 0.18 | 7.1 |
| | | | | 1.92 | 9.6 |
| | | | | 4.84 | 12.2 |
| Igepal CO-610 | 9 | 0.14 | 1.2 | 0.01 | 1.6 |
| | | 0.70 | 2.7 | 0.62 | 2.9 |
| | | 1.72 | 2.6 | 1.19 | 4.4 |
| | | 3.26 | 4.6 | 4.03 | 3.2 |
| | | 6.10 | 4.7 | 6.38 | 3.7 |
| | | 8.50 | 5.0 | 9.08 | 3.1 |
| Igepal CO-630 | 9.5 | 0.35 | 0.5 | 0.16 | 1.1 |
| | | 0.82 | 2.3 | 0.26 | 4.1 |
| | | 1.98 | 1.7 | 0.47 | 6.8 |
| | | 4.38 | 2.1 | 0.57 | 14.8 |
| | | 7.08 | 1.4 | 0.70 | 22.6 |
| | | 9.65 | 1.2 | 1.63 | 27.9 |
| Igepal CO-710 | 10.5 | 0.46 | 0.1 | 0.04 | 1.5 |
| | | 1.01 | 1.6 | 0.29 | 4.0 |
| | | 2.19 | 1.0 | 0.22 | 7.6 |
| | | 4.57 | 1.4 | 2.74 | 7.5 |
| | | 7.06 | 1.5 | 3.39 | 13.7 |
| | | 9.43 | 1.9 | 4.67 | 17.8 |
| Igepal CO-730 | 15 | 0.33 | 0.6 | 0.30 | 0.67 |
| | | 1.18 | 1.1 | 1.21 | 0.97 |
| | | 2.08 | 1.4 | 2.47 | 0.01 |
| | | 4.78 | 0.7 | 4.72 | 0.93 |
| | | 7.24 | 0.9 | 7.35 | 0.50 |
| | | 9.29 | 2.4 | | |
| Igepal CO-990 | 100 | 1.23 | 1.38 | 0.02 | 0.77 |
| | | 2.88 | 1.39 | 0.39 | 1.20 |
| | | 3.65 | 1.50 | 1.12 | 1.27 |
| | | 4.13 | 1.40 | 2.06 | 1.47 |
| | | | | 7.10 | 1.33 |
| | | | | 9.54 | 1.54 |

[1] Average units (moles) of ethylene oxide per molecule of surfactant.

From the above data, it can be seen that with the surfactants having 6.7 to 10.5 units the amount of surfactant adsorbed increased as the temperature of the run was increased from 72° F. to 120° F., but that the same increase in activity was not realized with the surfactants having 15 and 100 units. Therefore, surfactants above about 11 units, e.g., 15 units, are not similar in activity to those having 6.7 to 11 units or 4 to 6.7 units. Accordingly, the surfactants having polyethylene oxide having ethylene oxide units of an average of 4 to 11 are distinct in activity for this invention from similar surfactants which have an average of greater than 11 units.

Certain modifications of the invention will become apparent to those skilled in the art and the illustrative details disclosed are not to be construed as imposing unnecessary limitations on the invention.

I claim:
1. In a process for producing oil from an oil stratum comprising injecting a slug of aqueous solution of surfactant having oil displacing properties, containing suspended minute solids which are moved through said stratum by a following driving fluid to aid in the displacement of oil, thereafter injecting an aqueous driving fluid so as to move said surfactant and solids through said stratum toward at least one offset well and displace oil thereinto, and recovering the displaced oil, the improvement comprising:
   incorporating in said solution a solution of a second surfactant having higher dispersing power than first said surfactant and having the formula

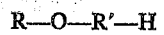

R—O—R'—H wherein R is an aliphatic alkyl of 5 to 20 carbon atoms or an alkylaryl, the alkyl having 8 to 20 carbon atoms, and R' is polyethylene oxide of an average of 30 to 100 units, in solution in a concentration in the range of 0.01 to 1 weight percent, said solids being of a size in the range of 0.001 to 1 micron.

2. The process of claim 1 wherein the solids are carbon black and the surfactants are dissolved in water before introducing said solids to the solution.

3. The process of claim 1 wherein the solids are carbon black particles, the surfactant of the improvement is dissolved in water, said solids are added to the solution and the resulting suspension is centrifuged and settlings removed, and the surfactant having oil-displacing properties is dissolved in the centrifuged suspension.

4. A process according to claim 1 wherein:
from 0.05 to 1 pore volume of said aqueous slug is injected; and
said first mentioned surfactant having oil displacing properties has the formula R—R'—R"—H wherein R is an aliphatic alkyl of 9 to 20 carbon atoms or an alkylaryl of which the alkyl has 8 to 20 carbon atoms and the aryl is attached to R', R' is O or S, and R" is polyethylene oxide of an average of 4 to 11 units, and is in solution in a concentration in the range of 0.01 to 1 weight percent.

5. The process of claim 4 wherein said solids are carbon black particles.

6. The process of claim 4 wherein said solids are kaolin particles.

7. The process of claim 4 wherein said solids are talc particles.

8. The process of claim 4 wherein the first mentioned surfactant is nonylphenoxypolyethanol having an average chain length on the hydrophilic end in the range of 6 to 6.5 moles or units of ethylene oxide.

9. The process of claim 4 wherein the second surfactant is a nonylphenoxypolyethanol having an average chain length on the hydrophilic end in the range of 95 to 100 moles or units of ethylene oxide.

10. The process of claim 4 wherein the solids are carbon black, the first mentioned surfactant is nonylphenoxypolyethanol having an average chain length on the hydrophilic end in the range of 6 to 6.5 moles or units of ethylene oxide, and the second surfactant is a nonylphenoxypolyethanol having an average chain length on the hydrophilic end in the range of 95 to 100 moles or units of ethylene oxide.

References Cited

UNITED STATES PATENTS

| | | | |
|---|---|---|---|
| 2,060,210 | 11/1936 | Heckert | 252—314 X |
| 2,176,879 | 10/1939 | Bartell | 252—314 X |
| 2,965,172 | 12/1960 | DaRoza | 166—42 |
| 3,051,234 | 8/1962 | Kyte | 166—9 |
| 3,100,524 | 8/1963 | Beeson | 166—9 |
| 3,131,759 | 5/1964 | Slusser et al. | |
| 3,170,514 | 2/1965 | Harvey et al. | 166—9 |
| 3,288,213 | 11/1966 | King et al. | 166—9 |
| 3,323,589 | 6/1967 | Harvey | 166—9 |
| 3,384,171 | 5/1968 | Parker | 166—9 |
| 3,412,792 | 11/1968 | Parker et al. | 166—9 |

STEPHEN J. NOVOSAD, Primary Examiner

U.S. Cl. X.R.

166—275